(12) United States Patent
Chapman et al.

(10) Patent No.: US 7,532,627 B2
(45) Date of Patent: May 12, 2009

(54) WIDEBAND UPSTREAM PROTOCOL

(75) Inventors: John T. Chapman, Saratoga, CA (US); Alon Shlomo Bernstein, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 419 days.

(21) Appl. No.: 11/135,777

(22) Filed: May 23, 2005

(65) Prior Publication Data

US 2005/0265376 A1 Dec. 1, 2005

Related U.S. Application Data

(60) Provisional application No. 60/574,506, filed on May 25, 2004, provisional application No. 60/574,876, filed on May 26, 2004, provisional application No. 60/622,312, filed on Oct. 25, 2004, provisional application No. 60/624,490, filed on Nov. 1, 2004, provisional application No. 60/635,995, filed on Dec. 13, 2004, provisional application No. 60/588,635, filed on Jul. 16, 2004, provisional application No. 60/582,732, filed on Jun. 22, 2004, provisional application No. 60/590,509, filed on Jul. 23, 2004.

(51) Int. Cl.
*H04L 12/56* (2006.01)

(52) U.S. Cl. .................... 370/395.41; 370/429

(58) Field of Classification Search .................. None
See application file for complete search history.

(56) References Cited

U.S. PATENT DOCUMENTS

| | | |
|---|---|---|
| 4,977,593 A | 12/1990 | Balance |
| 5,153,763 A | 10/1992 | Pidgeon |
| 5,604,735 A | 2/1997 | Levinson et al. |
| 5,724,510 A | 3/1998 | Arndt et al. |
| 5,784,597 A | 7/1998 | Chiu et al. |
| 5,805,602 A | 9/1998 | Cloutier et al. |
| 5,918,019 A | 6/1999 | Valencia |

(Continued)

FOREIGN PATENT DOCUMENTS

WO    00/72509    11/2000

(Continued)

OTHER PUBLICATIONS

Postel, J., "User Datagram Protocol", RFC 768, Aug. 28, 1980, 3 pgs.

(Continued)

*Primary Examiner*—Hahn Nguyen
*Assistant Examiner*—Juvena Loo
(74) *Attorney, Agent, or Firm*—Stolowitz Ford Cowger LLP

(57) ABSTRACT

Some embodiments of the present invention may include a method to stream packets into a queue for an upstream transmission, send multiple requests for upstream bandwidth to transmit data from the queue and receiving multiple grants to transmit data, and transmit data from the queue to the upstream as grants are received. Another embodiment may provide a network comprising a cable modem termination system (CMTS), and a cable modem wherein the cable modem may transmit data to the CMTS with a streaming protocol that sends multiple requests for upstream bandwidth to transmit data and receives multiple grants to transmit data, and transmits data to the CMTS as grants are received.

15 Claims, 10 Drawing Sheets

U.S. PATENT DOCUMENTS

| | | | |
|---|---|---|---|
| 5,931,954 | A | 8/1999 | Hoshina et al. |
| 5,933,420 | A | 8/1999 | Jaszewski et al. |
| 5,963,557 | A | 10/1999 | Eng |
| 6,023,769 | A | 2/2000 | Gonzalez |
| 6,078,595 | A | 6/2000 | Jones et al. |
| 6,101,180 | A | 8/2000 | Donahue et al. |
| 6,137,793 | A | 10/2000 | Gorman et al. |
| 6,233,246 | B1 | 5/2001 | Hareski et al. |
| 6,275,990 | B1 | 8/2001 | Dapper et al. |
| 6,381,214 | B1 | 4/2002 | Prasad |
| 6,418,324 | B1 | 7/2002 | Doviak et al. |
| 6,434,141 | B1 | 8/2002 | Oz et al. |
| 6,438,123 | B1* | 8/2002 | Chapman .................... 370/351 |
| 6,490,727 | B1 | 12/2002 | Nazarathy et al. |
| 6,510,162 | B1 | 1/2003 | Fijolek et al. |
| 6,516,345 | B1 | 2/2003 | Kracht |
| 6,546,017 | B1 | 4/2003 | Khaunte |
| 6,556,591 | B2 | 4/2003 | Bernath et al. |
| 6,640,248 | B1 | 10/2003 | Jorgensen |
| 6,693,878 | B1 | 2/2004 | Daruwalla et al. |
| 6,697,970 | B1 | 2/2004 | Chisholm |
| 6,698,022 | B1 | 2/2004 | Wu |
| 6,763,019 | B2 | 7/2004 | Mehta et al. |
| 6,763,032 | B1 | 7/2004 | Rabenko et al. |
| 6,771,606 | B1 | 8/2004 | Kuan |
| 6,804,251 | B1* | 10/2004 | Limb et al. ................. 370/444 |
| 6,819,682 | B1 | 11/2004 | Rabenko et al. |
| 6,847,635 | B1 | 1/2005 | Beser |
| 6,853,680 | B1 | 2/2005 | Nikolich |
| 6,857,132 | B1 | 2/2005 | Rakib et al. |
| 6,901,079 | B1 | 5/2005 | Phadnis et al. |
| 6,950,399 | B1 | 9/2005 | Bushmitch et al. |
| 6,959,042 | B1 | 10/2005 | Liu et al. |
| 6,993,016 | B1 | 1/2006 | Liva et al. |
| 6,996,129 | B2 | 2/2006 | Krause et al. |
| 7,007,296 | B2 | 2/2006 | Rakib et al. |
| 7,023,882 | B2 | 4/2006 | Woodward, Jr. et al. |
| 7,039,049 | B1 | 5/2006 | Akgun et al. |
| 7,065,779 | B1 | 6/2006 | Crocker et al. |
| 7,067,734 | B2 | 6/2006 | Abe et al. |
| 7,113,484 | B1 | 9/2006 | Chapman et al. |
| 7,116,643 | B2 | 10/2006 | Huang et al. |
| 7,117,526 | B1 | 10/2006 | Short |
| 7,139,923 | B1 | 11/2006 | Chapman et al. |
| 7,145,887 | B1 | 12/2006 | Akgun |
| 7,149,223 | B2 | 12/2006 | Liva et al. |
| 7,161,945 | B1 | 1/2007 | Cummings |
| 7,164,690 | B2 | 1/2007 | Limb et al. |
| 7,206,321 | B1 | 4/2007 | Bansal et al. |
| 7,209,442 | B1 | 4/2007 | Chapman |
| 7,269,159 | B1 | 9/2007 | Lai |
| 7,290,046 | B1 | 10/2007 | Kumar |
| 7,359,332 | B2 | 4/2008 | Kolze et al. |
| 7,363,629 | B2 | 4/2008 | Springer et al. |
| 2001/0010096 | A1* | 7/2001 | Horton et al. ................ 725/111 |
| 2001/0055319 | A1* | 12/2001 | Quigley et al. .............. 370/480 |
| 2001/0055469 | A1 | 12/2001 | Shida et al. |
| 2002/0009974 | A1 | 1/2002 | Kuwahara et al. |
| 2002/0010750 | A1 | 1/2002 | Baretzki |
| 2002/0052927 | A1 | 5/2002 | Park |
| 2002/0067721 | A1 | 6/2002 | Kye |
| 2002/0073432 | A1 | 6/2002 | Kolze |
| 2002/0073433 | A1 | 6/2002 | Furuta |
| 2002/0088003 | A1 | 7/2002 | Salee |
| 2002/0093935 | A1 | 7/2002 | Denney et al. |
| 2002/0093955 | A1 | 7/2002 | Grand et al. |
| 2002/0131403 | A1 | 9/2002 | Desai et al. |
| 2002/0131426 | A1 | 9/2002 | Amit et al. |
| 2002/0133618 | A1 | 9/2002 | Desai et al. |
| 2002/0136203 | A1 | 9/2002 | Liva et al. |
| 2002/0141585 | A1 | 10/2002 | Carr |
| 2002/0144284 | A1 | 10/2002 | Burroughs et al. |
| 2002/0146010 | A1 | 10/2002 | Shenoi et al. |
| 2002/0147978 | A1 | 10/2002 | Dolgonos et al. |
| 2002/0154655 | A1* | 10/2002 | Gummalla et al. .......... 370/468 |
| 2002/0161924 | A1 | 10/2002 | Perrin et al. |
| 2002/0198967 | A1 | 12/2002 | Iwanojko et al. |
| 2003/0014762 | A1 | 1/2003 | Conover et al. |
| 2003/0058794 | A1* | 3/2003 | Pantelias et al. ............. 370/230 |
| 2003/0061415 | A1* | 3/2003 | Horton et al. .................. 710/30 |
| 2003/0066087 | A1 | 4/2003 | Sawyer et al. |
| 2003/0067944 | A1 | 4/2003 | Sala et al. |
| 2003/0214943 | A1 | 11/2003 | Engstrom et al. |
| 2003/0214982 | A1 | 11/2003 | Lorek et al. |
| 2004/0039466 | A1 | 2/2004 | Lilly et al. |
| 2004/0045037 | A1 | 3/2004 | Cummings et al. |
| 2004/0073902 | A1 | 4/2004 | Kao et al. |
| 2004/0101077 | A1 | 5/2004 | Miller et al. |
| 2004/0105403 | A1 | 6/2004 | Lin et al. |
| 2004/0105406 | A1 | 6/2004 | Kayama et al. |
| 2004/0143593 | A1 | 7/2004 | Le Maut et al. |
| 2004/0160945 | A1 | 8/2004 | Dong et al. |
| 2004/0163129 | A1 | 8/2004 | Chapman et al. |
| 2004/0181800 | A1 | 9/2004 | Rakib et al. |
| 2004/0244043 | A1 | 12/2004 | Lind et al. |
| 2004/0248530 | A1* | 12/2004 | Rakib et al. .............. 455/127.4 |
| 2005/0018697 | A1 | 1/2005 | Enns et al. |
| 2005/0122976 | A1 | 6/2005 | Poli et al. |
| 2005/0138669 | A1 | 6/2005 | Baran |
| 2005/0198684 | A1 | 9/2005 | Stone et al. |
| 2005/0201399 | A1 | 9/2005 | Woodward, Jr. et al. |
| 2005/0232294 | A1 | 10/2005 | Quigley et al. |
| 2005/0259645 | A1 | 11/2005 | Chen et al. |
| 2005/0265261 | A1 | 12/2005 | Droms et al. |
| 2005/0265309 | A1 | 12/2005 | Parandekar |
| 2005/0265338 | A1 | 12/2005 | Chapman et al. |
| 2005/0265376 | A1 | 12/2005 | Chapman et al. |
| 2005/0265392 | A1 | 12/2005 | Fox et al. |
| 2005/0265394 | A1 | 12/2005 | Chapman et al. |
| 2005/0265397 | A1 | 12/2005 | Chapman et al. |
| 2005/0265398 | A1 | 12/2005 | Chapman et al. |
| 2005/0289623 | A1 | 12/2005 | Midani et al. |
| 2006/0002294 | A1 | 1/2006 | Chapman et al. |
| 2006/0126660 | A1 | 6/2006 | Denney et al. |
| 2006/0159100 | A1 | 7/2006 | Droms et al. |
| 2006/0168612 | A1 | 7/2006 | Chapman et al. |
| 2007/0274345 | A1 | 11/2007 | Taylor et al. |
| 2008/0037545 | A1 | 2/2008 | Lansing et al. |

FOREIGN PATENT DOCUMENTS

| | | |
|---|---|---|
| WO | 0072509 | 11/2000 |
| WO | 2005117310 | 12/2005 |
| WO | 2005117358 | 12/2005 |

OTHER PUBLICATIONS

Postel, Jon, Editor, "DARPA Internet Program Protocol Specification", RFC 791, Sep. 1981, 45 pages.

Deering, S., "Host Extensions for IP Multicasting", RFC 1112, Aug. 1989.

Droms, R., "Dynamic Host Configuration Protocol", RFC 2131, Mar. 1997.

Townsley, W., et al., "Layer Two Tunneling Protocol "L2TP"", RFC 2661, Aug. 1999, 80 pages.

Cable Television Laboratories, Inc., "Data-Over-Cable Service Interface Specifications DOCSIS 2.0, Radio Frequency Specification", SP-RFIv2.0-I04-030730, 1999-2003, 512 pages.

Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, Copyright 1999-2005.

Cable Television Laboratories, Inc., "Data-Over-Cable Service Interface Specifications DOCSIS 2.0, Radio Frequency Specification", CM-SP-RFIv2.0-I09-050812, 1999-2005, 534 pages.

Cable Television Laboratories, Inc., "DOCSIS® Set-top Gateway (DSG) Interface Specification" CM-SP-DSG-I02-040804, Copyright 2001-2004.
Cable Television Laboratories, Inc., "DOCSIS® Set-top Gateway (DSG) Interface Specification" CM-SP-DSG-I04-050408, Copyright 2001-2005.
Bhattacharyya, et al., "An Overview of Source-Specific Multicast (SSM)", RFC 3569, Jul. 2003.
Droms, R., et al., "Dynamic Host Configuration Protocol for IPv6 (DHCPv6)", RFC 3315, Jul. 2003.
Droms, R., "Stateless Dynamic Host Configuration Protocol (DHCP) Service for IPv6", RFC 3736, Apr. 2004.
Chapman, John T., "CMTS Remote PHY for a DOCSIS Network: DMPI Over IP Protocol Specification", RP-SP-DoIP-D1-040715B.doc, Cisco Systems, Inc., EDCS-387722, May 26, 2004.
Cisco Systems, Inc., DHCP and the DOCSIS Configuration File for Cable Modems (DOCSIS 1.0), Document ID: 10961, Sep. 16, 2004.
IEEE Standards, "802.16, IEEE Standard for Local and Metropolitan Area Networks, Part 16: Air Interface for Fixed Broadband Wireless Access Systems", IEEE Std. 802.16—2004, Oct. 1, 2004, 893 pages.
Cable Television Laboratories, Inc., "Data-Over-Cable Service Interface Specifications Modular CMTS", CM-SP-DEPI-W003-050302, 49 pgs., Copyright 2005.
Ramakrishnan, Sangeeta, "Next Generation Edge—Realizing the vision of shared resources and bandwidth", SCTE Conference on Emerging Technologies, Jan. 11-13, 2005, 16 pgs.
Chapman, John T., "Remote PHY Technical White Paper Addendum," Downstream External PHY Interface Specification, Cisco Systems, Inc., EDCS-377253, Jan. 24, 2005.
Cisco Systems, Inc., "Downstream External PHY Interface Specification", SP-DEPI-W2-041101A.DOC, EDCS-408926, Jan. 25, 2005.
Lau, J., et al., "Layer Two Tunneling Protocol—Version 3 (L2TPv3)," RFC 3931, Mar. 2005, 94 pages.
Cable Televsion Laboratories, Inc., "DOCSIS Radio Frequency Interface Specification", CM-SP-RFIv2.0-I10-051209, 538 pgs., Dec. 9, 2005.
Madvinsky, et al., Dont't Let Your Modem Be Cloned, Jun. 2000, pp. 1-7, Communications Technology.
Millet, Theft of Service-Inevitable?, Dec. 2005, pp. 1-4, Communications Technology.
ETSI, Data-Over-Cable Systems Part 2 Radio Frequency Interface Specifications, Jan. 2003, pp. 59-66, ES 201 488-2 V1.21.
Desai, et al., FastChannel: A Higher-Speed Cable Data Service, AT&T Labs-Research, pp. 1-13.
Adoba, et al., Extensible Authentication Protocol (EAP), RFC 3748, Jun. 2004, pp. 1-64, Standards Track.
ITU-T Telecommunication Standardization Sector of ITU, Series J: Cable Networks And Transmission Of Television, Sound Programme And Other Multimedia Signals, Interactive Systems For Digital Television Distribution, Recommendation J.122, Dec. 2002, 506 pages, International Telecommunication Union.
U.S. Appl. No. 11/131,766, filed May 17, 2005, Chapman et al.
U.S. Appl. No. 11/135,777, filed May 23, 2005, Chapman et al.
U.S. Appl. No. 11/137,606, filed May 24, 2005, Chapman et al.
Ramakrishnan, Sangeeta, "Next Generation Edge—Realizing the vision of shared resources and bandwidth", date unknown, 16 pgs.
Cisco Systems, Inc., "Downstream External PHY Interface Specification", SP-DEPI-W2-041101A.DOC, EDCS-408926, date unknown.
Chapman, John T., "Remote PHY Technical White Paper Addendum," Downstream External PHY Interface Specification, Cisco Systems, Inc., EDCS-377253, date unknown.
Chapman, John T., "CMTS Remote PHY for a DOCSIS Network: DMPI Over IP Protocol Specification", RP-SP-DoIP-D1-040715B.doc, Cisco Systems, Inc., EDCS-387722, date unknown.

Cable Television Laboratories, Inc., "Data-Over-Cable Service Interface Specifications DOCSIS 2.0, Radio Frequency Specification", SP-RFIv2.0-I04-030730, 1999-2003, 488 pages.
Ramakrishnan, Sangeeta, "Next-Generation Edge—Realizing the vision of shared resources and bandwidth", date unknown, 16 pgs.
Chapman, John T., "CMTS Remote PHY for a DOCSIS Network: DMPI Over IP Protocol Specification", RP-SP-DoIP-D1-040715B.doc, Cisco Systems, Inc., EDCS-387722, May 26, 2004.
Postel, Jon, Editor, "DARPA Internet Program Protocol Specification", RFC 791, Sep. 1981, 45 pages.
Deering, S., "Host Extensions for IP Multicasting", RFC 1112, Aug. 1989.
Droms, R., "Dynamic Host Configuration Protocol", RFC 2131, Mar. 1997.
Cable Television Laboratories, Inc., "Data-Over-Cable Service Interface Specifications DOCSIS 2.0, Radio Frequency Specification", SP-RFIv2.0-I04-030730, 1999-2003, 488 pages.
Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, © 1999-2005.
Adoba, et al. Extensible Authentication Protocol (EAP), RFC 3748, Jun. 2004, pp. 1-64, Standards Track.
ITU-T Telecommunications Standardization Sector of ITU, Series J: Cable Networks And Transmission of Television, Sound Programme and other Multimedia Signals, Interactive Systems for Digital Television Distribution, Recommendation J. 122, Dec. 2002, 506 pages, International Telecommunications Union.
Cable Television Laboratories, Inc., "DOCSIS Radio Frequency Interfaces Specification", CM-SP-RFIv2.0-I10-051209, 538 pgs., Dec. 9, 2005.
Madvinsky, et al., Don't Let Your Modem Be Cloned, Jun. 2000, pp. 1-7, Communications Technology.
Data Over Cable Service Interface Specification, Aug. 4, 1997.
Ethereal: Display Filter Reference: DOCSIS Upstream Channel Descriptor, Webarchivedate Apr. 27, 2004.
DOCSIS Set Top Gateway (DSG) interface specification, Feb. 28, 2002.
An Overview of Internet Protocols, Dann, Jan. 1998.
Patrick, M.; RFC3046-DHCP Rely Agent Information Option; The Internet Society (2001) http://www.faqs.org/rfcs/rfc3046.html; Jan. 2001; 11 pages.
Cable Television Laboratories, Inc., Interim Specification, Data-Over-Cable Service Interface Specifications, Radio Frequency Specification, SP-RFIv1.1-I02-990731, Jul. 30, 1999, 353 pages.
Cable Television Laboratories, Inc., Interim Specification, Data-Over-Cable Service Interface Specifications, Radio Frequency Interface Specification, SP-RFIv1.1-I04-000407, Apr. 7, 2000, 376 pages.
3COM, High-Speed Cable Internet Solutions, http://www.3com.com/cablenow/pdf/7125dsht.pdf, Dec. 1999, 4 pages.
Phuc H. Tran, USPTO Office Action Paper No.20080427, May 1, 2008, 10 pages.
U.S. Appl. No. 11/292,725, Bernstein et al., "Advanced Multicast Support for Cable", filed Dec. 1, 2005.
Thompson, et al. IPv6 Stateless Address Autoconfiguration, RFC 2462, Dec. 1998, pp. 1-24, Network Working Group.
Thompson, et al. IPv6 Stateless Address Autoconfiguration, RFC 4862, Sep. 2007, pp. 1-29, Network Working Group.
Hawa et al., "Quality of Service Scheduling in Cable and Broadband Wireless Access Systems," at http://www.ittc.ku.edu/publications/documents/Hawa2002_iwqos_paper.pdf, downloaded on Sep. 29, 2008.

* cited by examiner

WIDEBAND UPSTREAM PROTOCOL

RELATED APPLICATIONS

This application claims priority of U.S. provisional patent application No. 60/574,506, filed May 25, 2004, and U.S. provisional patent application No. 60/574,876, filed May 26, 2004, and U.S. provisional patent application No. 60/622,312, filed Oct. 25, 2004, and U.S. provisional patent application No. 60/624,490, filed Nov. 1, 2004, and U.S. provisional patent application No. 60/635,995, filed Dec. 13, 2004, and U.S. provisional patent application No. 60/588,635, filed Jul. 16, 2004, U.S. provisional patent application No. 60/582,732, filed Jun. 22, 2004, and U.S. provisional patent application No. 60/590,509, filed Jul. 23, 2004.

BACKGROUND OF THE INVENTION

The Internet has changed society and is as much a part of modern culture as television and telephones. People are becoming increasingly connected to share and access information. This interconnectivity promotes improvements in the computing and communication infrastructure.

Much of this infrastructure was designed for entertainment or communication, but is being adapted to deliver general data. The addition of general information and data transmission over the legacy infrastructure has necessarily been somewhat restrained by the need for the infrastructure to continue its initial functions. Furthermore, legacy technical characteristics of this infrastructure influence the various solutions to include information storage and transmission. Most major entertainment and communication channels now include computer networking capabilities.

Many people get their television service through cable television (CATV). CATV was initially developed to deliver television signals to areas where antennas had difficulty picking up television broadcasts. Coaxial cabling is the primary type of cabling used by the cable television industry because it is much less susceptible to interference and can carry large amounts of data.

Television signals are broadcast in 6 MHz channels and this channel bandwidth was incorporated into cable television. As transmission demands increased, parts of the coaxial backbone were replaced with optical fiber to create a hybrid fiber-coaxial (HFC) network. The bandwidth of the cable infrastructure makes it an attractive technology to incorporate data transmission.

An example use of data over a cable television network was approved by the International Telecommunications Union (ITU) which includes interface requirements for high speed data communication, and is called the data over cable service interface specification (DOCSIS).

Cable service providers also offer internet service through the cable television network in 6 MHz channels for downstream data. Upstream data has historically received less bandwidth and has been offered in a fraction of a channel, such as in 2 MHz provisions. This asymmetry was due to the Internet initially being an information provider. Currently, peer-to-peer computing, file sharing, gaming, and other uses have increased the need for upstream bandwidth.

Due to the legacy CATV infrastructure primarily being a broadcast channel, there are different modulation schemes for upstream and downstream transmission, for example, downstream utilize 64 and 256 Quadrature Amplitude Modulation (QAM) and upstream utilizes Quadrature Phase Shift Keying or 16 QAM.

Furthermore, to allow maximum data transmission through different networks, DOCSIS supports use of various combinations of modulation and therefore different data rates, which in turn complicates the physical layer in these networks.

Placing upstream and downstream data onto the cable television network requires special equipment at each end of the HFC plant. On the customer end, a cable modulator/demodulator (cable modem, or CM) transmits and receives data over the cable television infrastructure and on the cable provider end a cable modem termination system (CMTS) is used to place and retrieve data from the cable television network.

Typically a CMTS broadcasts to numerous CMs over a shared channel while each CM separately sends upstream data. In this framework, a cable modem must select only the broadcast downstream data that is intended for it while it must follow an arbitration protocol to avoid data collisions with other cable modems while transmitting upstream data.

Cable modems are identified by Service Identifiers (SIDs). SIDs are used as a BPI (baseline privacy) index on the downstream (DS) and also to designate upstream data to certain CMs for the CMTS on the upstream (US).

The upstream bandwidth is allocated by a CMTS and is shared among multiple CMs. Upstream transmissions are divided into mini-slots which may carry up to 1024 bytes, but in practice often contain considerably less bytes to conserve bandwidth. The arbitration protocol for upstream transmissions is assigned by a CMTS in response to requests by CMs. The CMTS communicates these assignments to each cable modem with a media access control (MAC) packet called a mini-slot allocation packet (MAP).

Currently, upstream bandwidth is limited. What is needed is a method and apparatus to satisfy the requirements of peer-to-peer computing, file sharing, distributed computing, gaming, and other applications which have an increased need for upstream bandwidth.

SUMMARY OF THE INVENTION

Some embodiments of the present invention may include a method to stream packets into a queue for an upstream transmission, send multiple requests for upstream bandwidth to transmit data from the queue and receiving multiple grants to transmit data, and transmit data from the queue to the upstream as grants are received.

Another embodiment may provide an apparatus comprising at least one request grant state machine to launch requests to transmit data to a cable modem termination station and receive grants to transmit data, and a packet streaming queue state machine to send packet streaming queue requests to the request grant state machine, wherein the packet streaming queue requests are managed separately from the requests to allow data in the packet streaming queue to be parsed in arbitrary data sizes.

Some embodiments may provide a network comprising a cable modem termination system (CMTS), and a cable modem wherein the cable modem may transmit data to the CMTS with a streaming protocol that sends multiple requests for upstream bandwidth to transmit data and receives multiple grants to transmit data, and transmits data to the CMTS as grants are received.

BRIEF DESCRIPTION OF THE DRAWINGS

Embodiments of the invention may be best understood by reading the disclosure with reference to the drawings, wherein.

DETAILED DESCRIPTION

In the following description, numerous specific details are set forth. However, it is understood that embodiments of the inventions may be practiced without these specific details. In other instances, well-known circuits, structures, and techniques have not been shown in detail in order to not obscure the understanding of this description.

Reference in the specification to "one embodiment" or "an embodiment", etc., means that a particular feature, structure, or characteristic described in connection with the embodiment is included in at least one aspect of the invention. The appearances of the phrase "in one embodiment" in various places in the specification do not necessarily all refer to the same embodiment.

Generally, a wideband upstream protocol may be developed. In one embodiment, the wideband upstream places identifiers into discrete portions of a data flow, and can therefore distribute the data in a streaming fashion over one or multiple channels.

Furthermore, an embodiment may place the data in one or multiple queues, and can parse arbitrary sizes of the data from the queue or queues, and send the arbitrary sizes of data to a remote device. In an embodiment, streaming allows multiple requests for bandwidth and as grants for bandwidth requests are returned, the streaming protocol can parse the data in a queue or queues relative to the grants, and therefore dissociate grants from requests. The protocol uses the identifiers to correctly manage the data at the receiving end.

Embodiments are not limited to any specific network or architecture. The cable embodiments described herein are for purposes of illustration, but embodiments are not so limited. Other example embodiments may be deployed over a digital subscriber line (DSL), in an Ethernet network or in a wireless environment, etc.

An embodiment may comprise an apparatus to receive multiple outstanding requests for upstream bandwidth, to send multiple grants for upstream bandwidth, and to receive data from a remote device in response to the grants for upstream bandwidth. An embodiment may be the remote device that sends multiple requests for upstream bandwidth, receives multiple grants for upstream bandwidth, and sends data in response to the grants for upstream bandwidth.

An embodiment may comprise a system including a remote device and an apparatus, the remote device to send multiple outstanding requests for upstream bandwidth, the apparatus to send multiple grants for upstream bandwidth, and the remote device to send data in response to the grants for upstream bandwidth.

Figure 1:
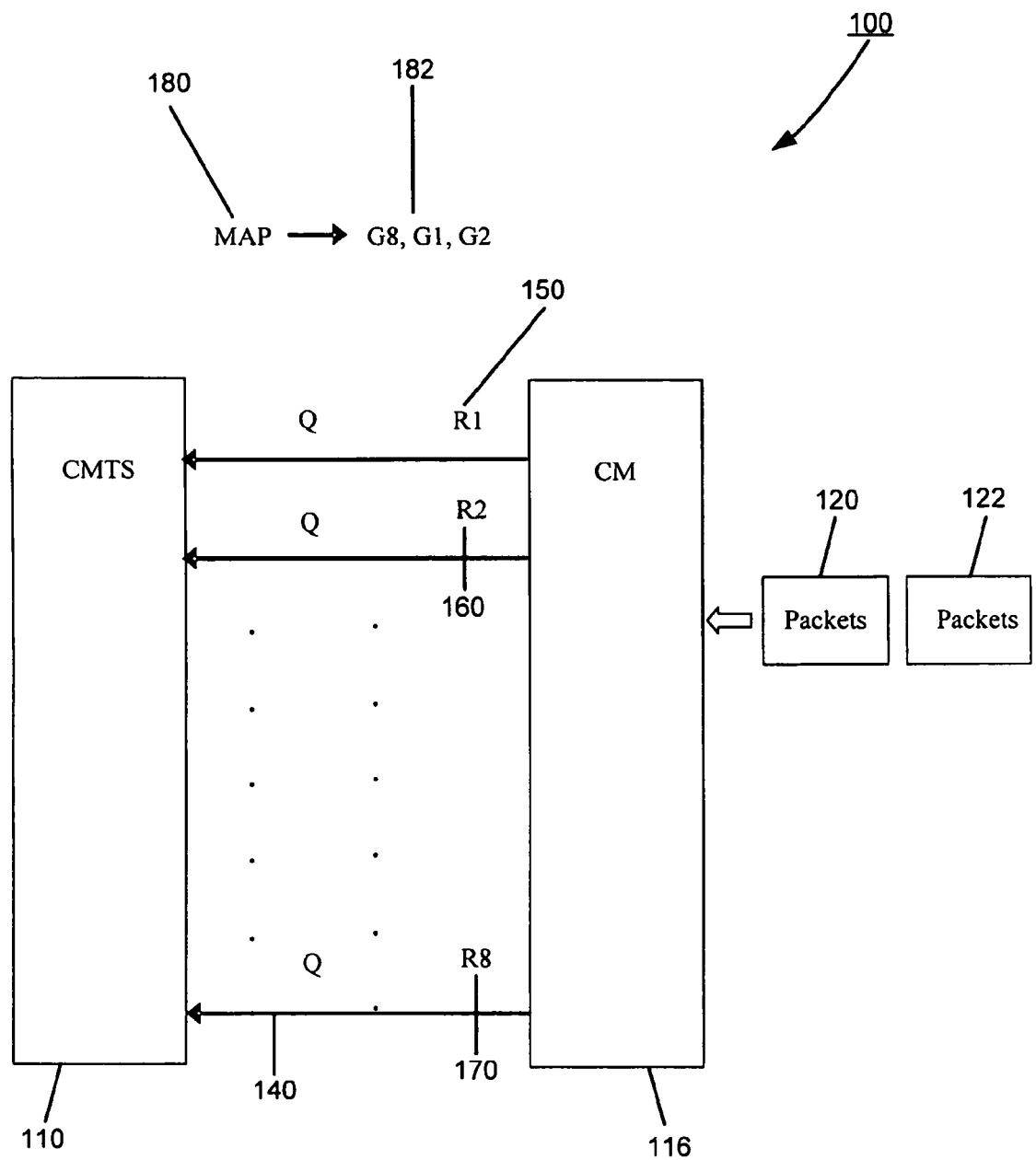
FIG. 1 illustrates a cable modem and cable modem termination station with requests and a mini-slot allocation packet comprising grants for a wideband cable upstream protocol.

FIG. 1 illustrates a cable modem (CM) 115 and CMTS 110 with requests 150, 160 and 170, and a mini-slot allocation packet (MAP) 180 comprising grants 182 for a wideband cable upstream protocol. The CM 115 is coupled with the CMTS by multiple modulated channels. Conventional hardware utilizes QAMs 140, but embodiments of the present invention are not so limited to any type of modulation, for example QPSK or other modulation types may be used.

Referring to FIG. 1, three QAMs are explicitly shown with dotted lines representing more QAMs. FIG. 1 includes packets 120, 122 flowing to CM 115 comprising data that the CM 115 will subsequently request upstream bandwidth from the CMTS 110 to transmit the data in the packets to the CMTS 110. The MAP 180 in FIG. 1 is represented as containing grants 182 including G8, G1 and G2.

Referring to the present embodiment, a cable modem may have multiple upstream QAMs, for example 8 QAMs. In the present embodiment, each QAM may get initialized as a DOCSIS upstream so it can transfer data over the cable service. Additionally, the DOCSIS initialization may happen individually for each QAM with each QAM terminating into a conventional CMTS. Since each QAM may initialize individually, the QAMs may be different speeds, or may even all be the same speed. In one embodiment, a CM 115 may send data across multiple QAMs 140 in the upstream to the CMTS 110. An embodiment may overlay on top of a conventional DOCSIS narrowband upstream.

CM 115 upstream transmissions typically require an arbitration protocol to sequence the upstream data and avoid collisions between multiple CMs 115. This is different than downstream transmissions from a CMTS where there is a continuous transmission, for example, typically only one transmitter using simple queuing.

The data over cable service interface specification (DOCSIS) provides a method of bandwidth allocation and timing. For example, CMs 115 may send requests to a CMTS 110 and the CMTS 110 may send a MAP 180 downstream to a CM 115. The MAP 180 typically describes bandwidth allocation and timing for any CM 115 coupled with CMTS 110.

In an embodiment, data may be sent between the CM 115 and CMTS 110 in data groups called mini-slots. Mini-slots may be groups of Forward Error Correction (FEC) blocks which are further comprised of bytes. Mini-slots are configurable but often are 8 or 16 bytes. A MAP 180 includes information stating which CM 115 is assigned to a mini-slot.

In an embodiment, mini-slots are assigned to CMs 115 by SIDs. A SID is a dynamically assigned address to a cable modem and is generally 13 or 14 bits. SIDs are conventionally assigned when a CM 115 comes online. After SIDs are assigned, a CMTS 110 schedules CM 115 bandwidth allocation and communicates the allocation to a CM 115 with a MAP 180.

Referring to FIG. 1, a CM 115 is shown sending requests 150, 160 and 170 to the CMTS 110. In DOCSIS, CMs 115 must request bandwidth to send upstream data. For example, if a CM 115 has a 1500 byte packet to send, the CM 115 sends a request packet to the CMTS 110 and the CMTS 110 may grant any amount of the 1500 bytes to send.

In an embodiment, requests from CMs 115 go through a contention slot where times set aside called "request intervals" when CMs 115 send their requests 150 to the CMTS 110. If more than one CM 115 sends a request 150 to the CMTS 110, the request 150 does not get through. When requests 150 are successful, the CMTS 110 notifies the CM 115. In the event that the request 150 does not get through, the CM 115 has to resend the request 150. Once a CMTS 110 gets a request 150, it schedules the bandwidth for the associated CM 115. Sent packets can contain a request called a "piggyback request" so the CM 115 can avoid contention. In this regard, a CM 115 can send multiple packets with piggyback requests and avoid contention.

Furthermore, if a CM 115 has not sent data for a certain time, packets can get backed up. The next time the CM 115 requests, it can take those packets, concatenate them together into a big concatenation frame and send a request for the concatenation frame.

An additional problem is that a CMTS may only schedule a portion of data requested to be sent. For example, a CM 115 may request to send 2,000 bytes and the head end (CMTS 110) may initially schedule only 1,000 bytes and wait to schedule any of the remaining bytes. A cable modem protocol may therefore provide for collecting or parsing of data, in this example, the DOCSIS protocol provides for concatenating and fragmenting frames. The concatenation and fragmentation may occur within a single QAM.

Figure 2:
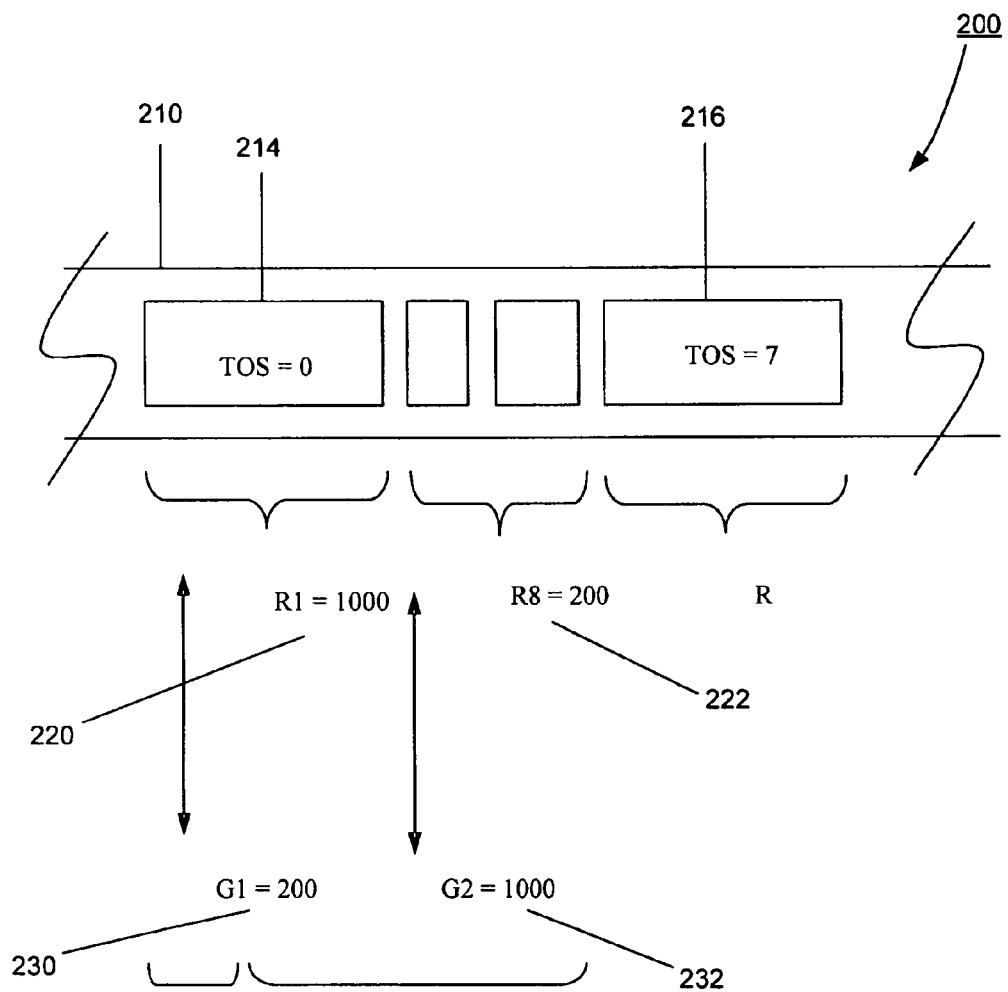
FIG. 2 illustrates a streaming protocol comprising packets with requests and upstream grants.

FIG. 2 illustrates a streaming protocol comprising packets 214, 216, etc., queued in a stream 210, with requests 220 and 222 and upstream grants 230 and 232. In the present embodiment, packets are queued into one stream 210. The streaming protocol in FIG. 2 is different than DOCSIS concatenation in that DOCSIS concatenation takes a fixed number of packets, puts a frame around the packets, and ships the frame. That is, DOCSIS concatenation takes whatever is in the queue.

The present embodiment can continually build the stream of packets 214, 216 etc. In a streaming protocol, bits are constantly being fed into one or multiple queues. As packets come in, a streaming protocol can identify blocks of packets, such as packets 214, 216, and generate requests 220, 222, for these packets.

In one embodiment the requests 220, 222, are launched on different upstreams. Referring back to the embodiment in FIG. 1, a CM 115 may receive 8 upstreams at 10 megabits per second, which is 80 megabits per second of available bandwidth. In the present embodiment, the CM 115 may send a request 150, 160 and 170 on each upstream to the CMTS 110 for 1000 bytes. The CMTS 110 may then respond with a MAP 180 containing grants 182. Although the requests might go up R1, R2 and R8, the grants 182 might return in a different order, for example, grant 8, grant 1, grant 2, as shown.

In the present embodiment, a streaming protocol allows the CM 115 to use the first grant that comes back. In conventional DOCSIS, after a request is made on an upstream, a CM 115 may get a grant for that upstream, and send data in that same upstream. In the present embodiment, the CM 115 is going to take data from the front of the streaming protocol and place it in that upstream.

Referring back to the embodiment in FIG. 2, if the CM 115 requested 1,000 bytes with request 220, and 200 bytes with request 222, and the CM 115 receives a grant 230 for 200 bytes, the CM 115 may carve 200 bytes from the front of the queue, or streaming protocol, and send it on the first grant 230. This results in a dissociation of requests and grants.

With a dissociation of requests and grants, a CM 115 can launch requests and when the first grants return, can send data out so that the transit delay through the upstreams is the lowest possible. Ultimately the number of bytes from requests will equal the number of bytes that get granted. In this embodiment, additional upstreams decrease delay as more grants may be received and the data may be parsed more and sent more quickly.

Figure 3:
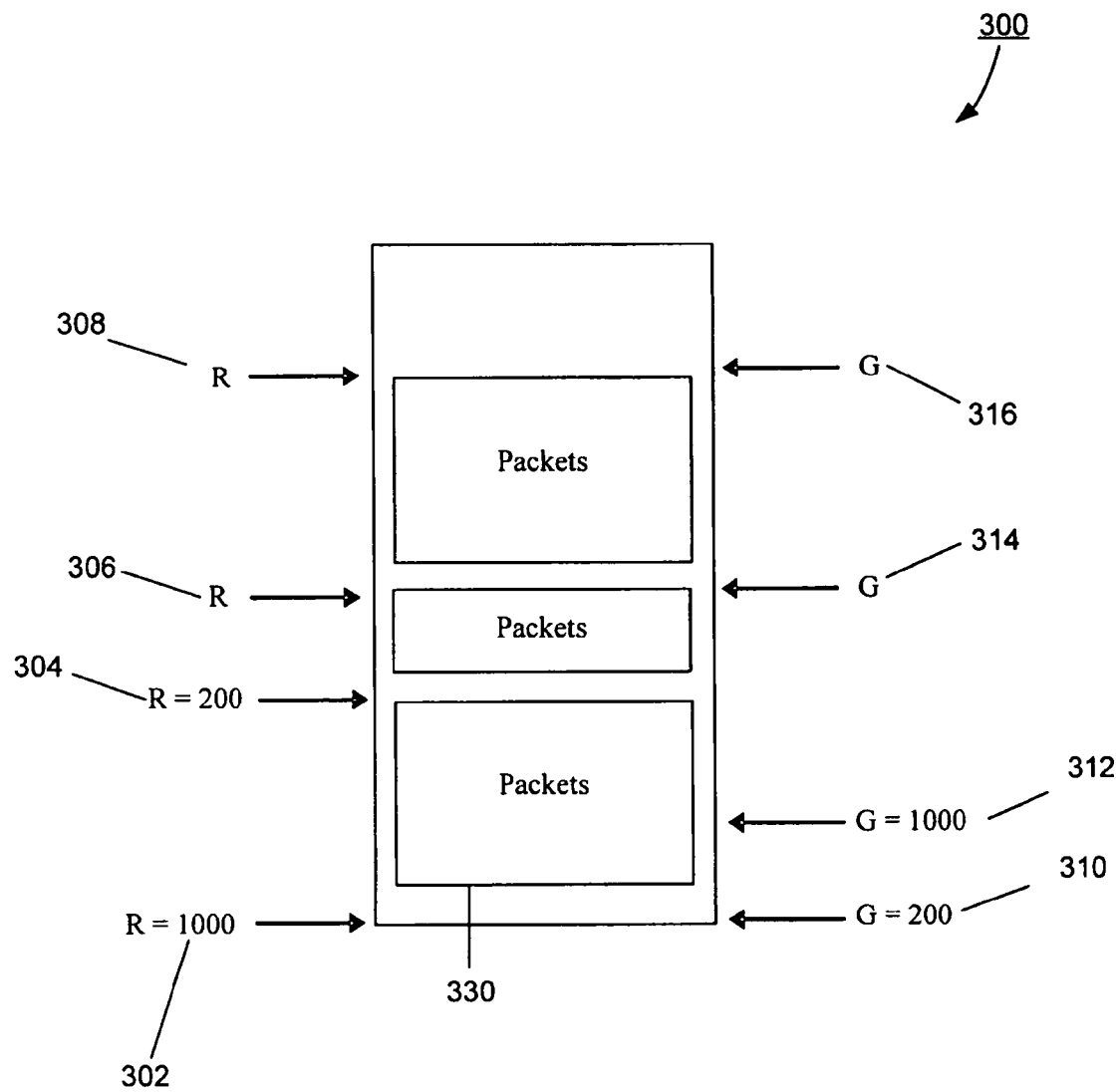
FIG. 3 illustrates a buffer example with disassociated requests and grants.

FIG. 3 illustrates an embodiment streaming protocol with a request/grant dissociation represented as a buffer 300 containing packets 330. The request and grant dissociation is represented here with a request pointer initially at request 302 and a grant pointer, initially at grant 310. In this example, when a request is launched, the request pointer moves up and when a grant is issued the grant pointer moves up.

According to this embodiment, the request pointer 302 may signify a 1000 byte request, followed by the request pointer 304 signifying a 200 byte request. Initially, the grant pointer 310 is illustrated as representing a grant of 200 bytes, which allows a streaming protocol to carve 200 bytes from the packet 330 at the bottom of the buffer 300. The second grant 312 may be 1000 bytes and the grant pointer can continue in this fashion up buffer 300.

This example illustrates a dissociation between the first request 302 that was for 1000 bytes and the first grant 310 for 200 bytes. The request pointers may continue in this fashion completely dissociated from the grant pointer side of the buffer. Eventually, the request and grant pointers end up at the top of buffer 300.

The DOCSIS protocol mandates one outstanding request at a time. That is, after a CM 115 sends a request, it waits until it gets a grant. In the present embodiment, multiple outstanding requests are allowed before reception of a grant. Embodiments provide multiple streaming protocols that may dissociate requests and grants. For example, requests may be launched on either separate QAMs and/or separate SIDs within a QAM.

The DOCSIS specification disallows more than one outstanding request per SID, which allows a CM 115 to set two SIDs and double its throughput as long as each SID carries independent traffic. Therefore, an embodiment may comprise an aggregated stream of traffic that may be spread across multiple physical channels which can then be reassembled at a far end, for example, by embedding sequence numbers into a data stream, such as in headers in the data stream. Additionally, because the association is not needed it is possible to use the streaming mode even with a single SID by allowing multiple outstanding grants at a time.

In an embodiment, a cable modem, or other transmit or receive device, can accelerate a request/grant cycle. An embodiment may do so even for a single SID on a single upstream in the manner described herein. Request and grant dissociation, described in the streaming protocol above, allows multiple outstanding requests or grants per SID. In an embodiment this dissociation further simplifies flow management to the amount of data transmitted, for example a number of bytes.

Since embodiments may use multiple outstanding requests, they can request in parallel multiple grants and more quickly drain a buffer or other storage. This may result in an overload of a contention channel since due to all the requests being sent on the channel, but a cable modem or other transmit or receive device may use a piggy back request approach and reduce the number of requests per channel. In an embodiment this may be based on a configuration policy. For example, a cable modem, or other device, may have 1,000 bytes of data to send and it can launch 4 substantially simultaneous requests for 250 bytes at the same time, or send 2 requests for 250 bytes and as grants come back piggyback more requests for the remaining data. Example embodiments may further append more than one request to a single data packet or may distribute the requests over multiple data packets, for example a request per data packet.

Figure 4:
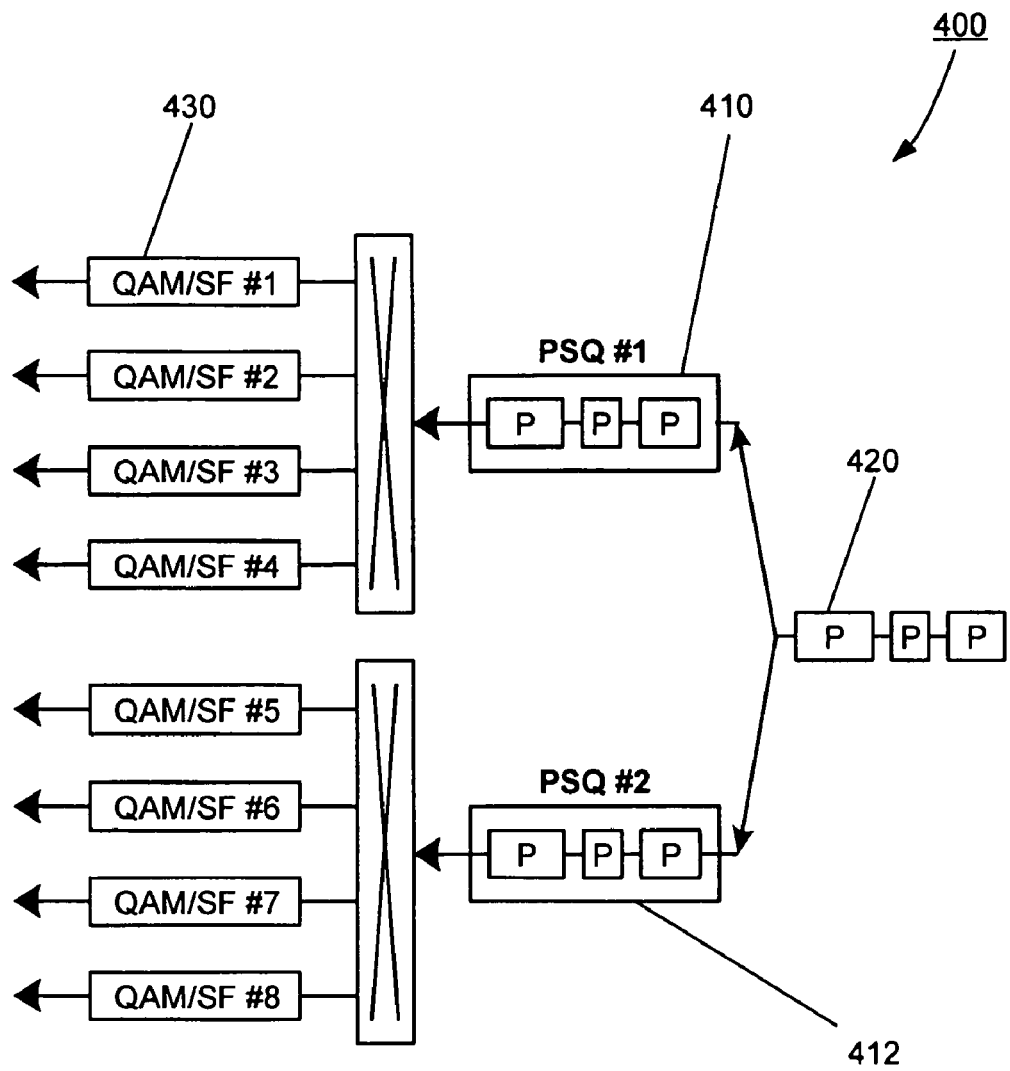
FIG. 4 illustrates an upstream portion of a wideband cable modem including multiple packet streaming queues (PSQs).

FIG. 4 illustrates an embodiment including an upstream 400 using multiple upstream packet streaming queues (PSQs). Incoming packets 420 are sorted into PSQs 410 and 412. An embodiment may comprise one PSQ per Quality of Service (QoS) queue. The packets 420 may then be sent, or even parsed and sent, over one or more QAMs 430 and/or service flows.

In the present embodiment, a CMTS may manage QoS at the CM. By allowing a CMTS to manage QoS at a CM, the CMTS can prevent head-of-line blocking, a scenario where a higher priority packet may get stuck behind a lower priority packet. A conventional unit for QoS provisioning is called a service flow (SF). For example, DOCSIS 1.1 allows multiple service flows per cable modem. This means that different types of traffic like data, voice, and video can be separately identified on the same cable modem in order to provide specialized QoS treatment relative to traffic needs. The output of the PSQ 410 and 412 may then be sent to a SF chosen from a group of SFs, which in turn are located on one QAM carrier 430 chosen from within a group of upstream QAM carriers. In an embodiment there could be any number of PSQs 410 and 412, each with any number of QAM/SF combinations.

In one embodiment there is a request/grant state machine in the hardware of a cable modem. Another embodiment may allow one outstanding request per SID, and some embodiments may function a layer above that and utilize multiple SIDs/multiple QAMs. Some embodiments may re-specify the operation of request grant/state machines at both the cable modem and a CMTS, to utilize multiple outstanding requests on the same channel.

In a conventional approach, multiple outstanding requests on the same channel produced problems. Therefore the conventional approach could not acknowledge multiple requests effectively, for example, a problem could arise by dropping one request yet having an outstanding one with a different packet size. By placing an identifier with the data and parsing the data in arbitrary sizes, data can still be sent when grants are dissociated from requests.

A legacy CMTS might handle bandwidth requests but then transmit information in normal DOCSIS, that is, with packets. The present embodiment can pass information in arbitrary sizes and is therefore not restricted to passing packets. This allows passing blocks of parsed data from a streaming protocol. But by passing blocks of data, functionality must exist on the other end of a connection to take those blocks and turn them into packets again. One way to manage reassembly of packets is to tunnel each flow. Tunneling allows operating in the current environment with legacy equipment.

Figure 5:
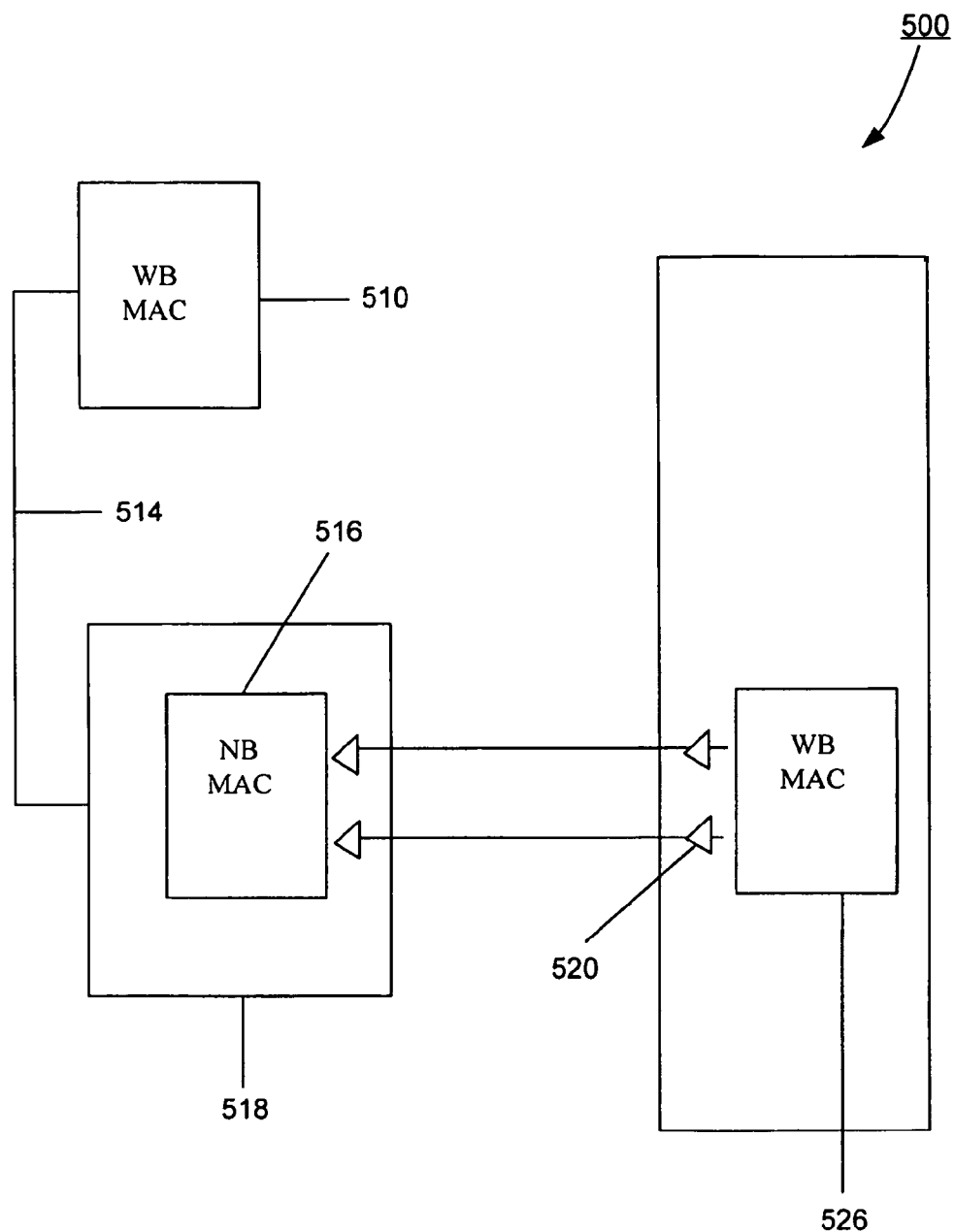
FIG. 5 illustrates a wideband upstream tunnel and reassembly engine.

FIG. 5 illustrates a wideband upstream tunnel and reassembly engine. In an embodiment a wideband MAC 526 may be coupled to a conventional DOCSIS narrowband upstream 518, for example a narrowband MAC 516, through one or a plurality of QAMs 520. The narrowband upstream 518 may then send data through a wideband tunnel 514 to another wideband MAC 510 comprising a reassembly engine.

The embodiment illustrated in FIG. 5 allows tunneling of an embodiment of the present invention through conventional architecture, which utilizes legacy silicon and reduces adoption costs. Referring to FIG. 5, the QAMs 520 can connect an embodiment wideband MAC 526 into a DOCSIS narrowband upstream 518, and yet still have a completely separate wideband MAC 510 connected transparently by a wideband upstream tunnel 514 to a reassembly engine. This tunneling embodiment can in turn collect frames, or other data units, from different channels and reassemble them upstream. In another embodiment, downstream legacy hardware can also be used for tunneling embodiments of the present invention.

Figure 6:
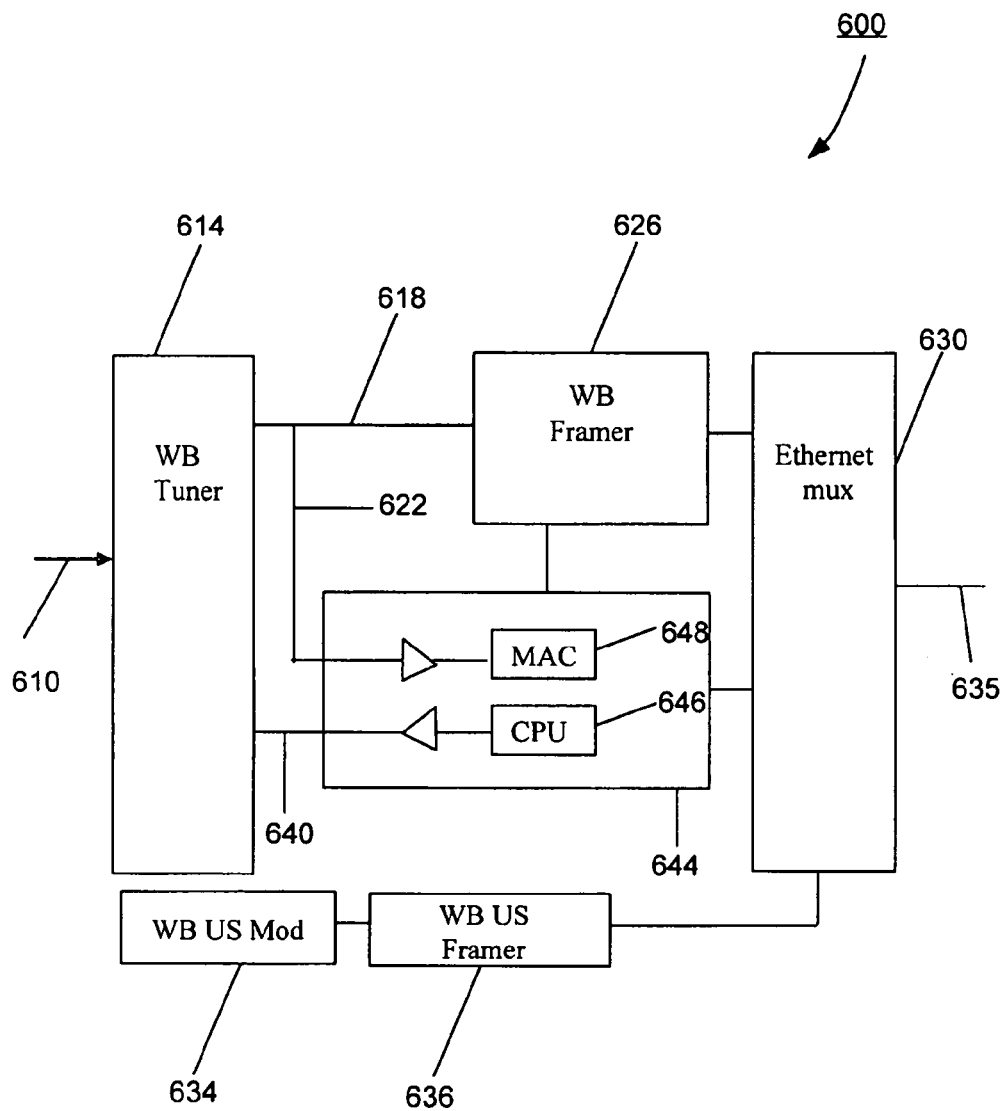
FIG. 6 illustrates an example wideband cable modem.

FIG. 6 illustrates an embodiment wideband cable modem 600. The present embodiment may use hardware 644, such as a DOCSIS capable chip, that comprises a MAC 648 and a processing device, for example CPU 646. CPU 646 may be coupled with bus 640 to the wideband tuner 614.

The MAC 648 may be coupled to bus 622 and therefore coupled with a tuner such as wideband tuner 614, and may receive conventional narrow band data over bus 622. In an embodiment bus 622 can branch from bus 618. In an embodiment bus 618 may comprise 16 channels. Bus 618 may be coupled to a wideband tuner 614 which may send and receive RF signals at 610. In the present embodiment, bus 618 couples wideband tuner 614 with a wideband framer 626. The wideband framer may then couple with an Ethernet multiplexer 630 which in turn may be connected to the DOCSIS capable chip 644. The Ethernet multiplexer 630 may also be coupled with a wideband upstream framer 636 which is coupled to a wideband upstream modulator.

Figure 7:
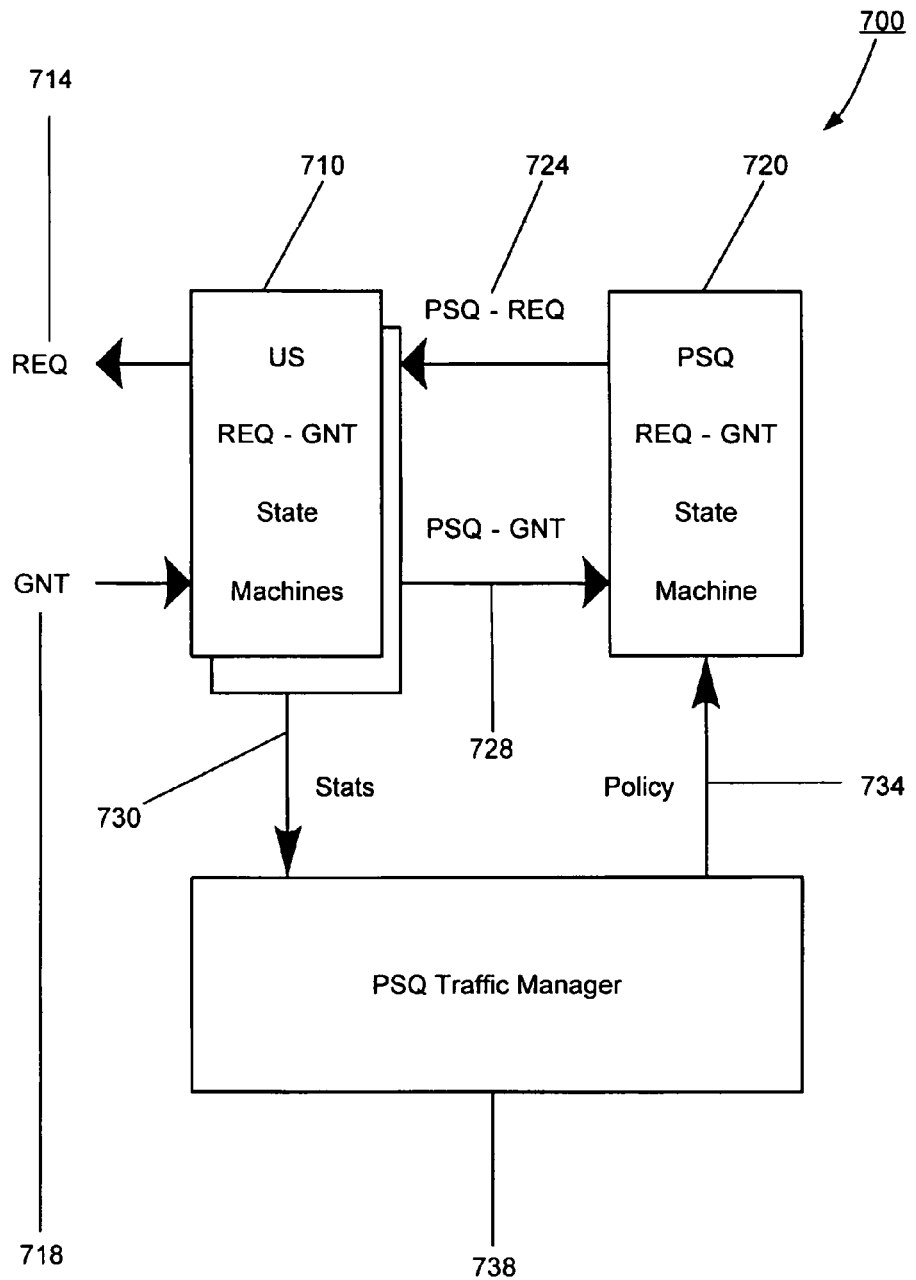
FIG. 7 illustrates an apparatus with an upstream request grant state machines and a packet streaming queue request grant state machine.

FIG. 7 illustrates upstream request/grant state machines 710 and a packet streaming queue request/grant state machine 720. In the present embodiment, as a PSQ begins to collect bytes, a PSQ state machine 720 may issue PSQ requests (PSQ-REQs) 724 to at least one DOCSIS request/grant state machine 710. The DOCSIS request/grant state machine 710 can launch requests (REQs) 714 to a CMTS, for example, to send a given number of bytes, and the CMTS may respond with grants (GNTs) 718 to the DOCSIS request/grant state machine 710. Conventionally, one outstanding REQ is permitted per Service Flow per upstream QAM carrier. The use of multiple upstream QAM/SF combinations allows multiple PSQ-REQ to be outstanding at any one time.

Referring to FIG. 7, a PSQ traffic manager 738 may choose which upstream QAM channel and on which DOCSIS Service Flow to launch a REQ 714. In an embodiment this may be based upon the perceived least busy upstream channel, upon some weighting criteria supplied by the WCMTS, or even a simple round-robin approach, as examples.

In another embodiment, the size of PSQ-REQ 724 can be a configuration parameter from a wideband CMTS (WCMTS) to a wideband CM (WCM). PSQ-REQ 724 size is allowed to not line up with a packet boundary. In some embodiments, it may be a fraction of a packet length, multiple packet lengths, both, etc. In other embodiments, it may be a pre-determined value, a multiple of a predetermined value, or an arbitrary value, as examples. One choice is to have a value of PSQ-REQ 724 chosen so that a wideband payload would fill upstream FEC Blocks efficiently.

In some embodiments, each PSQ, as it receives more packets, continues to generate PSQ-REQs 724 without waiting for PSQ-GNTs 728. In one embodiment each PSQ may generate PSQ-REQs 724 up to a maximum number of outstanding PSQ-REQs allowed. Eventually a WCMTS sends back transmit opportunities within MAPs, where the MAPs comprise GNTs 718.

In some embodiments, a streaming protocol as disclosed herein can be used for QOS. For example, multiple streaming protocols may be applied to data and voice traffic. In one embodiment, multiple streaming protocols may utilize different SIDs and launch unique sets of requests and grants. This embodiment would comprise output queueing QOS.

A conventional approach may receive packets and send them to different queues depending upon a type of service (TOS) value. For example, a conventional approach may use multiple TOS queues, for example queues 0 through 7, and couple them with an output queue where the output queue manages requests and grants with a request/grant state machine.

An embodiment utilizing QOS may receive packets into multiple streaming protocols, for example into queues 0 through 7 with each queue running a streaming protocol. In this embodiment, outputs may use different SIDs, or QAMs, and could launch requests on any of them. Therefore, upon reception of a grant, an embodiment may pull data from any desired stream, for example by different TOS streams or by differentiated services code points (DSCP), and apply it to the received grant. Data could therefore traverse different QOS pipes and may be reassembled and sequenced. Another embodiment may comprise multiple TOS pipes at a cable modem and at a CMTS.

In an embodiment, wideband queuing, such as with a streaming protocol as described herein, can be viewed as a form of hierarchal queuing. In this embodiment, each individual upstreams/flows may be classified as a first level of the hierarchy and the WB channel itself may be classified as a second level of the hierarchy. A hierarchal policy can define how much a single flow, for example a flow designated with a service flow identifier (SFID), can overload an upstream as well as how much an aggregate flow can be.

Figure 8:
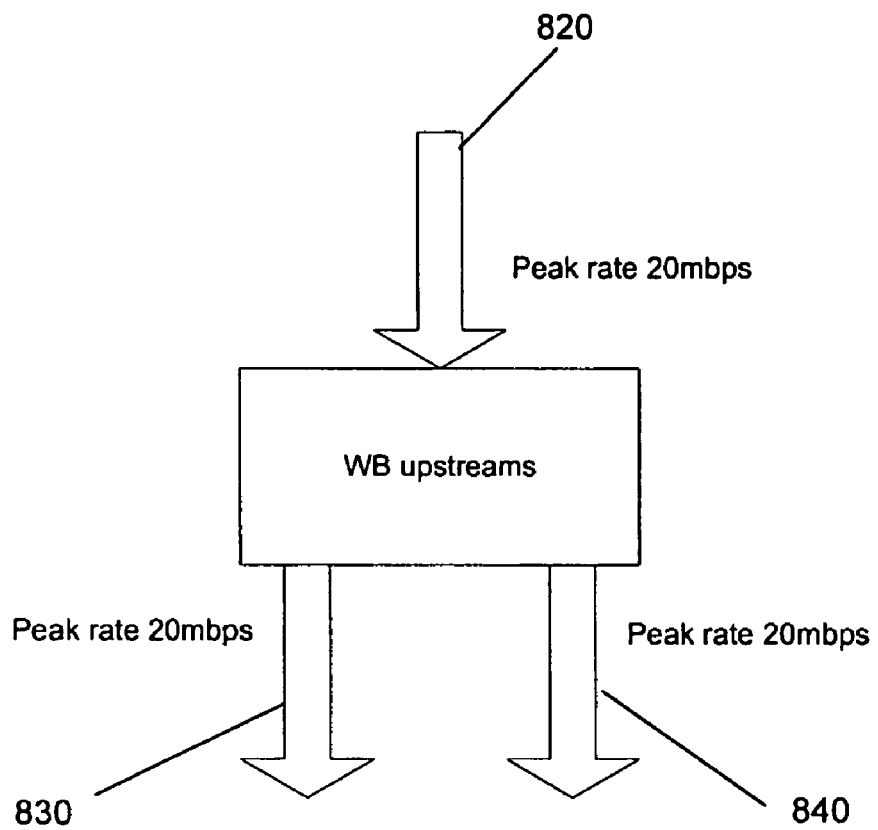
FIG. 8 illustrates hierarchical queueing as provided by embodiments of the present invention.

Referring to FIG. 8, an individual service flow 820 may be striped across 2 SIDs 830 and 840, and be rate limited to 20 mbps. The individual service flows 830 and 840 may also be rate limited to 20 mbps. As a result, if one upstream is congested an embodiment can send 1 mbps on one upstream 19 mbps on the other.

All flows, individual and aggregates, may be defined using standard DOCSIS 2.0 TLVs. An aggregate QoS mapping TLV may associate a group of flows with an aggregate by associating a set of service flow references to an aggregated service flow reference.

To provision fine-grained control over striped data QoS at a CM, an embodiment may define the following QoS parameters and pass to the CM through a configuration file during initialization: lower hierarchy involving individual service flow QoS, such as for each SID resource, and a higher hierarchy such as an aggregate QoS across SIDs.

Referring to FIG. 8, in an embodiment, if both individual and aggregate rate limits of a two level hierarchy are defined, then each of the individual flows with SIDs may be rate limited to conform to the lower hierarchy while the aggregate rate limit may conform to an aggregated QoS across SIDs. QoS attributes, such as peak rate/committed rate/priority/burst size can therefore be defined for both individual service flow QoS and for the aggregate flow. Some embodiments may configure individual QoS, but no aggregate QoS rate limit or configure only aggregate QoS with no QoS on the individual flows. In other embodiments no QoS may actually be defined, therefore allowing the individual flows to consume link bandwidth.

In another embodiment, a CMTS may implement QoS. For example, a CMTS can impose a limit on aggregate traffic of a wideband channel when there is a need to share the same upstream, for example with traditional DOCSIS channels or other bonded channels. In an embodiment a bonded channel is a group of physically separated entities that can carry a single stream of data by means of "stripping" the data across multiple channels. In an embodiment, the entities may be physically separated by different frequencies or different wirings. Basic units that can be stripped include bytes, or frames or packet, as examples.

A hierarchical scheduling embodiment described above is not limited to any hierarchical policies, for example it may be used for two different ISPs to share the same upstream, or it may be used for two logical channels to share an upstream.

In an embodiment, a single CM can support multiple bonded channels. For example, a CM can have a 20 Mbps flow with no Committed Rate (Best effort), and a 50 Mbps flow with a Committed rate of 10 Mbps. In the present embodiment these flows may each be mapped to a separate group of SIDs, and striped independently.

In this embodiment, a CMTS controls bandwidth allocation for each bonded flow. A CM would only have to pick a SID that is available for transmission and do a DOCSIS 1.1 style rate shaping per SID and per bonded flow. In an embodiment, a flow provides a load balancing policy for a CM modem by preventing the CM from moving all of its traffic to one channel in case the other channels get congested.

In another embodiment, another option is to provide a cable modem with a "pipe" that is wide enough to accommodate both flows. For example, the pipe might have a CIR of 10 Mbps and a peak rate of 70 mbps (the sum of both peak rates). The individual flows comprising the pipe would have an aggregate CIR of 10 Mbps. In this embodiment, a CMTS manages the bandwidth allocation for the pipe and will ensure the pipe gets a 70 Mbps peak rate and a 10 Mbps committed rate.

Both techniques are valid ways of managing two flows. The first technique provides more discretionary control by a CMTS, and the second technique provides more discretionary control by a CM. The first technique might make more sense for basic CMs, while the second technique might make sense when the CM is actually an access router in a commercial deployment.

To utilize the added functionality of this streaming, or wideband, protocol, several SIDs may be configured. That is, all SIDs have to be coordinated between a CM and the CMTS. Therefore, to enable wideband upstream and bring it on line, an embodiment may register each upstream like a conventional upstream.

Figure 9:
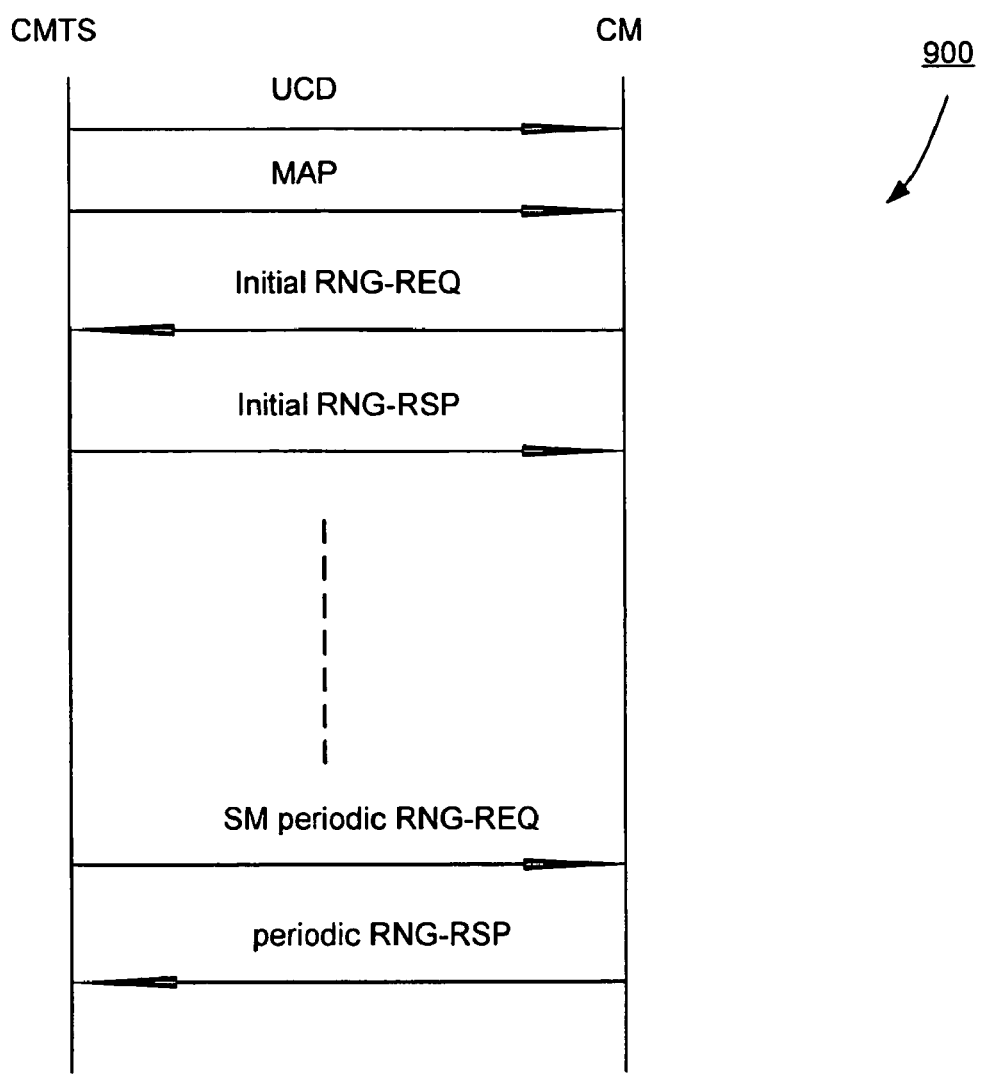
FIG. 9 illustrates a modem registration.

FIG. 9 represents a portion of a modem registration. Some embodiments may use a double registration where they register narrowband and wideband separately, and other embodiments may use a single registration where both are done in one registration procedure.

In FIG. 9, a CMTS may send upstream channel descriptors (UCDs) to define the characteristics of an embodiment wideband upstream channel. A CM may pick a UCD and, for example UCD 1, and could then receive MAP messages, which allocate the upstream PHY. Once map messages are received, a CM may send an initial maintenance message such as a range request (RNG-REQ) and the CMTS may reply with a range response (RNG-RSP). So far this illustrates a DOCSIS registration.

Conventionally at this stage, there would be a trivial file transfer protocol exchange (TFTP), a dynamic host configuration protocol (DHCP) exchange for an IP address, a time of day (TOD) exchange, and perhaps other conventional exchanges. In an embodiment these steps are skipped at this point and the cable modem may go directly into station maintenance.

Referring to FIG. 9, there is a station maintenance periodic RNG-REQ, a periodic RNG-RSP, and a keep-alive function (not shown). In one embodiment TFTP, DHCP, time of day, etc., may be skipped when all the information needed to register a modem is already gathered. For example, a cable modem will not need to register each one of a plurality of upstreams and have a different set of TFTP and DHCP's per upstream if it already has all the relevant information from another registration.

A double registration modem may have a narrowband registration and a wideband registration. Therefore a wideband registration file may already contain all the information needed to bring multiple downstreams online as well as all the information needed for a service flow for the upstream.

In the present embodiment, as an upstream begins registration, the cable modem may apply the relevant values already received from an initial TFTP exchange. This present an interesting issue regarding how to define a TFTP file in such a way that it will apply to multiple upstreams even though it only conducted a single DHCP process. This is accomplished with type-length-value (TLV). A TLV is an encoding method consisting of three fields, a first field indicating the type of an element, a second field indicating the length of an element, and a third field that contains an element's value.

In DOCSIS when you define service flows or any type of information you have a TLV. In an embodiment a TLV may be used to define a service flow. Under that TLV the present embodiment may have a sub-TLV that would contain specific service flow information.

Furthermore, TLVs may be nested. For example, an embodiment may define 5 service flows. This embodiment may use 5 TLVs that define service flows and within each one of these 5 TLVs it may encapsulate sub-TLVs. An example sub-TLV that may be encapsulated in one of the 5 example TLVs may state a peak rate of 1 megabit for the related service flow. In this embodiment, a TLV may name service flows 1, 2, 3, 4, etc., and a sub-TLV may define the specific parameters for each service flow. In another embodiment, a super TLV that we will call an upstream identifier, or SID identifier, etc., may be used to distinguish flows as not only a flow that belongs to a specific modem but a flow that belongs to a specific modem and a specific upstream. Higher orders of TLVs allow global identifiers to classify multiple service flows, this allows each individual service flow to have its normal definition.

For example, an embodiment may have an upper level TLV service flow associated with multiple service flows, therefore it can stripe information across five upstreams and instead of having five TFTP files with five configurations, it can have one TFTP file and be logically separated into five pieces by adding an upper dimension or upper level TLV. Lower level TLVs, on the other hand, allow differentiable control, for example to allow one stream to operate under conventional DOCSIS. Furthermore, this allows an embodiment high availability, for example if one upstream fails, an embodiment may stripe whatever it can over upstreams that are still available.

An example configuration file with multiple TLVs may use the following format:

03 (Net Access Control)=1
18 (Maximum Number of CPE)=4
22 (Upstream Packet Classification Encoding Block)
    S01 (Classifier Reference)=1
    S03 (Service Flow Reference)=3
    S05 (Rule Priority)=0
    S06 (Classifier Activation State)=1
    S09 (IP Packet Encodings)
    S05 (IP Destination Address)=011 001 002 001
    S06 (IP destination mask)=255 255 255 000
22 (Upstream Packet Classification Encoding Block)
    S01 (Classifier Reference)=1
    S03 (Service Flow Reference)=3←the aggregate flow service reference
    S05 (Rule Priority)=0
    S06 (Classifier Activation State)=1
    S09 (IP Packet Encodings)
    S06 (IP destination mask)=255 255 255 000
    S05 (IP destination address)=002 002 002 002
24 (Upstream Service Flow Encodings)←First SID for bonded group
    S01 (Service Flow Reference)=1
    S06 (QoS Parameter Set Type)=7
    S07 (Traffic Priority)=0
    S08 (Max Sustained Traffic Rate)=20000000
    S09 (Max Traffic Burst)=1522
    S10 (Min Reserved Traffic Rate)=0
    S12 (Timeout Active QoS Parms)=0
    S13 (Timeout Admitted QoS Parms)=0
    S15 (Service Flow Sched Type)=2
    S14 (Maximum Concatenated Burst)=1522
24 (Upstream Service Flow Encodings)←Second SID for bonded group
    S01 (Service Flow Reference)=2
    S06 (QoS Parameter Set Type)=7
    S08 (Max Sustained Traffic Rate)=0
    S09 (Max Traffic Burst)=1522
    S10 (Min Reserved Traffic Rate)=10000000
    S12 (Timeout Active QoS Parms)=0
    S13 (Timeout Admitted QoS Parms)=0
    S15 (Service Flow Sched Type)=2
    S16 (Request/Transmission Policy)=00 00 00 e0
24 (Upstream Service Flow Encodings)←The aggregate flow
    S01 (Service Flow Reference)=3
    S06 (QoS Parameter Set Type)=7
    S08 (Max Sustained Traffic Rate)=20000000
    S09 (Max Traffic Burst)=1522
    S12 (Timeout Active QoS Parms)=0
    S13 (Timeout Admitted QoS Parms)=0
    S15 (Service Flow Sched Type)=2
YY (Flow list mapping)
    S01 (service flow channel list)=01 02
    S02 (aggregated flow)=03
25 (Downstream Service Flow Encodings)
    S01 (Service Flow Reference)=3
    S06 (QoS Parameter Set Type)=7
    S07 (Traffic Priority)=0
    S08 (Max Sustained Traffic Rate)=10000000
    S09 (Max Traffic Burst)=1522
    S10 (Min Reserved Traffic Rate)=0
    S12 (Timeout Active QoS Parms)=0
    S13 (Timeout Admitted QoS Parms)=0
29 (Privacy Enable)=1

Referring the sample configuration file, the segment at 24 (Upstream Service Flow Encodings), S01 (Service Flow Reference)=3, may be considered a super TLV that encapsulates an aggregate flow. In an embodiment the TLV at 24 (Upstream Service Flow Encodings), S01 (Service Flow Reference)=3, may be classified in an upstream channel configuration group.

In the present embodiment, the 24 (Upstream Service Flow Encodings) with S01 (Service Flow Reference)=3, may correspond to defining a service flow, and sub-TLVs may be options of a service flow. For example, sub-TLV S08 may be a maximum sustained traffic rate and S09 may be a burst size, etc.

Referring to the configuration file, 24 (Upstream Service Flow Encodings) with S01 (Service Flow Reference)=1 may refer to a SID 1, and 24 (Upstream Service Flow Encodings) with S01 (Service Flow Reference)=2 may refer to a SID 2. In this example, Service Flow Reference=1 has a peak rate of 20,000,000 (for example, 20 megabits per second), Service Flow Reference=2 has a peak rate of 10,000,000. These values represent individually thresholds for each flow. In the example configuration file, both of these flows are mapped into the aggregate flow, Service Flow Reference=3, which is limited again to 20,000,000. This illustrates a way to manage separate and aggregated data streams as represented in FIG. 8. That is, the present embodiment provides a way of controlling how much bandwidth is allotted to a particular wideband upstream.

In another embodiment, the additional divisions and hierarchies of flow allows different control for each flow or over a large aggregated flow. For example, encryption may be needed on one upstream channel and not on another. Embodiments allow different keys per upstream, for example to selectively encrypt different channels based on some a user configuration.

Figure 10:
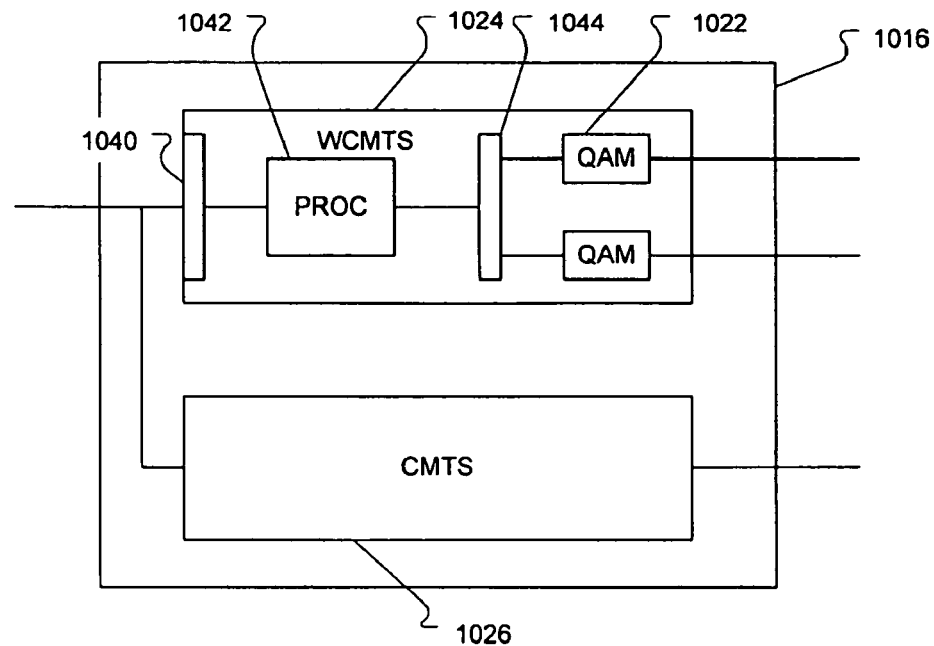
FIG. 10 illustrates an embodiment of a wideband cable modem termination system.

FIG. 10 illustrates an embodiment of a wideband cable modem termination server. In this particular embodiment, the QAMs 1022 are shown as residing with the CMTS. As mentioned above, this may not be the case. Also, the WCMTS 1016 may actually be comprised of a regular or narrowband CMTS 1026 and a wideband CMTS 1024. This is not a necessary configuration, as the two different types of CMTSs may be in separate devices, but may also provide some convenience in allowing both narrowband and wideband data to be handled by the same box.

Figure 11:
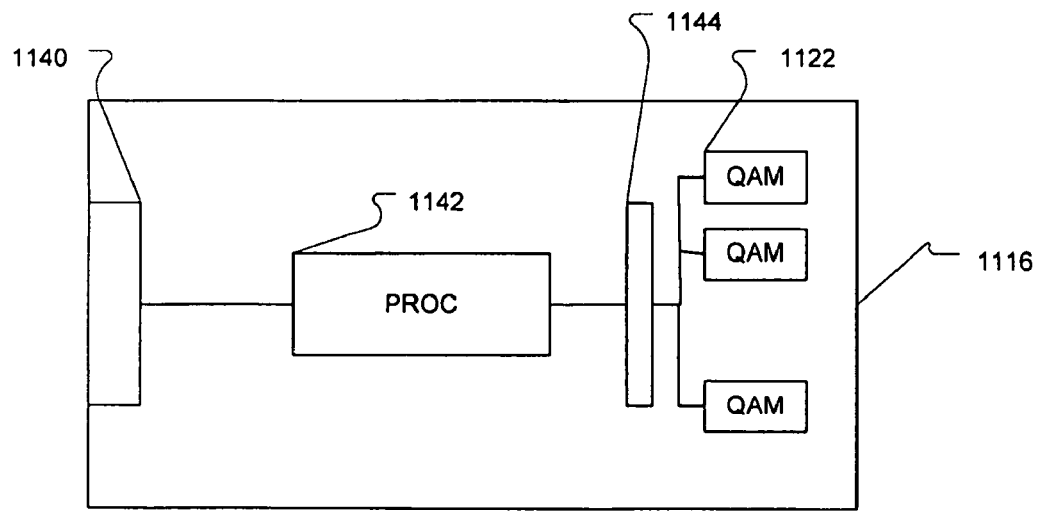
FIG. 11 illustrates an alternative embodiment of a wideband cable modem termination system.

The configuration shown as 1016 in FIG. 10 is an embodiment of a wideband-narrowband CMTS. An embodiment of a configuration of a standalone wideband CMTS is shown in FIG. 11. The embodiment of FIG. 11 includes QAMs 1122, but as mentioned above, this is one alternative embodiment. The wideband device will more than likely perform the same functions whether it is in a wideband-narrowband device or a standalone wideband CMTS, and will be discussed here with regard to FIG. 10.

The data is received from the GigE switch and sent to either the WCMTS or the CMTS depending upon the destination of the data. The WCTMS then receives the data through an interface compatible with the GigE data. In order to differentiate between the incoming and outgoing interfaces, the incoming interface or communications port will be referred to as communicating with the data network.

A processor 1042 receives the data from the data network, such as Ethernet frames. Ethernet frames refer to the data received in a format compatible with the Institute of Electrical and Electronic Engineers standard 802.3. The frames are then converted into DOCSIS packets and transmitted across the cable interface 1044 to the QAMs 1022. A wideband CMTS may use several narrowband channels to transmit data in the downstream. In one embodiment, a wideband channel is a collection of narrowband channels bonded together, and may be referred to as channel bonding.

In an embodiment, a method may comprise receiving multiple outstanding requests from a cable modem for upstream bandwidth to transmit data, sending multiple grants to a cable modem to transmit the data, and receiving and assembling the data from the cable modem. In some embodiments, the requests are received on separate QAMs. In some embodiments, the requests are received on separate SIDs within a QAM. In some embodiments, multiple requests are received for a single SID. The present embodiment may further comprise sending grants on separate SIDs within a QAM. An embodiment, may comprise hierarchical queueing with separate quality of service for each SID resource and an aggregate quality of service across a plurality of SIDs.

An embodiment may be an apparatus with a port to receive multiple outstanding requests from a cable modem for upstream bandwidth to transmit data, a port to send multiple grants to a cable modem to transmit the data, and a processor connect to the port, the processor to receive and assemble the data from the cable modem. The present embodiment may further comprise the processor being able to assemble striped data across multiple service flows. In this embodiment, the service flows may be combined with multiple QAMs to allow multiple requests to be outstanding.

Yet another embodiment may be an apparatus with means for receiving multiple outstanding requests from a cable modem for upstream bandwidth to transmit data, means for sending multiple grants to a cable modem to transmit the data, and means for receiving the data from the cable modem. In an embodiment, the means for receiving multiple outstanding requests further comprising means for receiving the requests on separate QAMs. In another embodiment, the means for receiving multiple outstanding requests further comprising means for receiving the requests on separate SIDs within a QAM.

In one embodiment, the means for sending multiple grants to a cable modem further comprising means for sending grants on separate SIDs within a QAM. In the present embodiment, the means for sending multiple grants to a cable modem further comprising hierarchical queueing with separate quality of service for each SID resource and an aggregate quality of service across a plurality of SIDs.

In an embodiment, a network may comprise a cable modem termination system (CMTS), and a cable modem in communication with the cable modem termination system, where the cable modem can transmit data to the CMTS with a streaming protocol that sends multiple requests for upstream bandwidth to transmit data and receives multiple grants to transmit data, and transmits data to the CMTS as grants are received.

The present invention may be embodied in other specific forms without departing from its spirit or essential characteristics. The described embodiments are to be considered in all respects only as illustrative instead of restrictive or limiting. Therefore, the scope of the invention is indicated by the appended claims rather than by the foregoing description. All changes, modifications, and alterations that come within the meaning, spirit, and range of equivalency of the claims are to be embraced as being within the scope of the appended claims.

The invention claimed is:

1. A method, comprising:
    transferring a wideband channel descriptor message from a cable modem termination system (CMTS), over a downstream channel, to a wideband cable modem including a plurality of Quadrature Amplitude Modulators (QAMs), the wideband channel descriptor message defining a wideband upstream channel that is distributed over a plurality of modulated upstream channels, wherein the modulated channels each extend to a different one of the cable modem QAMs;
    using the cable modem to range on the modulated upstream channels, wherein after the ranging the cable modem is contemporaneously communicatively coupled to the plurality of modulated channels;
    queuing packets on the wideband cable modem into a stream for an upstream cable transmission over the wideband upstream channel;
    partitioning the stream into a plurality of transmission blocks;
    sending a plurality of requests for upstream bandwidth over the wideband channel, the plurality of requests distributed over the modulated upstream channels subsequent to completing ranging on the modulated upstream channels, wherein each request is for an amount of bandwidth corresponding to one of the transmission blocks; and after receiving back a bandwidth grant, transmitting at least a portion of data taken from a first one of the transmission blocks according to the received bandwidth grant regardless of whether the received bandwidth grant is associated with the first transmission block;

wherein if the received bandwidth grant is associated with a transmission block other than the first transmission block, said transmission from the first transmission block in response to receiving the bandwidth grant disassociates bandwidth grants from bandwidth requests.

2. The method of claim 1 wherein the upstream communication load for the single wideband cable modem is distributed over the modulated channels.

3. The method of claim 1 wherein a first subset of the requests that are sent on a same one of the modulated channels are sent on separate Service Identifiers (SIDs).

4. The method of claim 3 further comprising receiving grants associated with the first subset on separate SIDs.

5. The method of claim 4 further comprising hierarchical queuing with separate quality of service for each SID resource and an aggregate quality of service across a plurality of SIDs.

6. The method of claim 1 wherein a second subset of the requests that are each sent on different modulated channels are sent on a single Service Identifier (SID).

7. An apparatus, comprising:
means for bonding a plurality of modulated upstream channels into a wideband upstream channel, wherein the bonded modulated upstream channels extend from a wideband cable modem, wherein each modulated channel is modulated using a different Quadrature Amplitude Modulator (QAM), and wherein the wideband upstream channel is for sending transmissions from the wideband cable modem to a cable modem termination system (CMTS);

means for streaming data packets into a queue for an upstream cable transmission over the wideband upstream channel;

means for organizing the queued data into different groups;

means for sending a plurality of requests for upstream bandwidth over the wideband upstream channel, the plurality of requests distributed over the modulated upstream channels, wherein each request is associated with one of the groups, and wherein each request indicates a requested bandwidth that corresponds to a quantity of data in the associated group; and means for transmitting data from the queue to the wideband upstream channel as grants are received in response to sending the requests, wherein data from one group is transmitted over a different modulated channel than a modulated channel used to send the request associated with said group.

8. An apparatus, comprising:
means for initializing a wideband cable modem for transmission over a plurality of modulated channels to a cable modem termination system, said initialization including ranging on each of the modulated channels;

means for streaming data packets into a queue for an upstream cable transmission;

means for sending multiple requests for upstream bandwidth to transmit data from the queue and receiving multiple grants to transmit the queued data, wherein the requests are associated with different portions of the data;

means for receiving back grants for at least a portion of the requests; and means for transmitting data from the front of the queue to the back of the queue to a wideband upstream channel as the grants are received, wherein the data is transmitted from the front to the back independently of an order of arrival of the grants;

wherein the requests are sent on separate Quadrature Amplitude Modulator (QAM) channels.

9. The apparatus of claim 7 wherein a portion of the requests are sent on separate Service Identifiers (SIDs) within a same QAM channel.

10. The apparatus of claim 9 further comprising means for receiving grants on separate SIDs within a QAM channel.

11. The apparatus of claim 7 further comprising means for hierarchical queuing with separate quality of service for each SID resource and an aggregate quality of service across a plurality of SIDs.

12. The apparatus of claim 1 wherein the modulated channels have overlapping frequency ranges.

13. The apparatus of claim 1 wherein each request is associated with a different service identifier.

14. The apparatus of claim 1 wherein the requests are transmitted with outstanding pending requests for upstream bandwidth.

15. The apparatus of claim 14 wherein the outstanding pending requests have different service identifiers than the requests.

* * * * *